Patented July 18, 1933

1,918,971

UNITED STATES PATENT OFFICE

ARCHIE R. KEMP OF WESTWOOD, AND JOHN H. INGMANSON, OF BLOOMFIELD, NEW JERSEY, ASSIGNORS TO BELL TELEPHONE LABORATORIES, INCORPORATED, OF NEW YORK, N. Y., A CORPORATION OF NEW YORK

INSULATION COMPOUND

No Drawing. Application filed January 18, 1930. Serial No. 421,872.

The present invention relates to insulating compositions particularly useful for submarine signaling cables.

An object is to improve the properties of such insulating compositions in respect to their leakance and dielectric constant as well as to improve their mechanical properties.

Insulating compositions composed of various proportions of gutta percha and/or balata, either deresinated or not, deproteinized rubber, and Montan wax or pitch, which may be purified, are known.

It has been found that such compositions are satisfactory for submarine cable insulation with respect to their mechanical properties such as cold flow, elasticity, extrudability and permanency. However, the presence of the Montan wax or pitch tends to increase the dielectric constant and the leakance of the material, more especially the latter. Omission of the Montan wax or pitch, on the other hand, results in a composition having mechanical properties which are not so satisfactory as when such ingredients are present.

In accordance with the present invention, compositions of balata and/or gutta percha, preferably wholly or partly deresinated, and rubber preferably deproteinized in accordance with the disclosure of British Specification 307,966, filed December 15, 1927, or otherwise, are mixed with from 1% to 20% of hydrocarbon wax of the kind sold upon the market as "Superla wax" which is a solid paraffin hydrocarbon wax derived from petroleum and having a melting point of 71° to 77° C. A range of materials having somewhat higher and somewhat lower melting points are also suitable. Reference is made to U. S. patent to Wendt and Banta 1,735,555, granted November 12, 1929 for a further description of such waxes and their mode of preparation. The information contained in the British Specification 307,966 and U. S. Patent 1,735,555 is a part of this disclosure.

The waxes previously referred to are preferred but the waxes known as ozokerite and ceresin as well as paraffines of a high melting point are suitable ingredients as substitutes to be used in part or whole in place of the other waxes. In accordance with a feature of the present invention the proportion of the wax constituent is maintained relatively low. Compositions containing over 20% of hydrocarbon wax are unsuitable for deep sea submarine cable insulation, because of their inferior mechanical properties. For these reasons it is necessary to keep the wax constituent low and although 20% is mentioned as the upper limit, 10% has been found to be a suitable proportion. Typical examples of satisfactory compositions are as follows:

|  | A | B | C |
|---|---|---|---|
| Deresinated balata | 47.5% | 45% | 50% |
| Deproteinized rubber | 47.5% | 45% | 40% |
| Superla wax | 5% | 10% | 10% |

These insulating compositions may be extruded satisfactorily, are sufficiently tough, are not too brittle at low temperatures, have lower dielectric constants, and lower leakance values, at 0° C. and 425 kg. per sq. cm., which are about one-third as great as similar compositions including lignite derivatives in the place of the hydrocarbon wax.

Composition C, for example, has a dielectric constant (K) of 2.6 and a ratio of leakance divided by capacity $$\left(\text{leakance ratio } \frac{G}{C}\right)$$

on actual cable cores of 12 to 16. G is measured in microhms per length of core and C in microfarads for the same length. These measurements were made at 2000 cycles per second, 2° C. and a pressure of 425° kg. per sq. cm.

In the preparation of such a composition the rubber is deproteinized and prepared in accordance with the method of British Specification 307,966. The crude balata is washed in the regular manner, excess moisture is removed, the material is dried and sheeted out. The resins are then extracted from the sheeted material by low boiling naphtha, the excess naphtha is removed and the rubber and balata are thoroughly mixed and washed together. Excess moisture is removed by mastication at a suitable temperature during which the wax is incorporated.

The essential hydrocarbons of gutta percha and balata are identical and will be referred to herein as gutta hydrocarbon. For the purposes of this specification gutta percha includes balata unless otherwise specified, but balata does not include gutta percha. Hydrocarbons and hydrocarbon waxes for the purposes of this specification include substances composed of carbon and hydrogen as essential chemical elements but do not include hydrocarbon derivatives, for example, esters of organic acids.

The gutta hydrocarbon employed in the compounds may be derived entirely from balata, entirely from gutta percha, or partly from either. The use of the rubber ingredient is optional. The example given and method of preparation outlined are illustrative and may be varied within the scope of the invention as defined by the claims.

What is claimed is:

1. An insulating composition composed of gutta percha, deproteinized natural rubber, and from 1% to 20% of paraffin hydrocarbon wax having a melting point between 60° and 85° C.

2. A composition comprising as essential ingredients, balata, deproteinized natural rubber, and from 1% to 20% of solid paraffin hydrocarbon wax having a melting point between 60° and 85° C.

3. A composition in accordance with claim 1 in which the gutta percha before inclusion in the composition has been deprived of substantial quantities of its natural resinous substances.

4. A composition in accordance with claim 1 in which the gutta percha is deresinated and the hydrocarbon wax comprises from 5% to 15% of wax having a melting point between 71° and 77° C.

5. An insulating composition comprising gutta percha hydrocarbon and from 1% to 20% of solid wax composed essentially of hydrocarbons of the paraffin series having a melting point lying within the range of 65° to 85° C.

ARCHIE R. KEMP.
JOHN H. INGMANSON.